(12) United States Patent
Enyedy et al.

(10) Patent No.: US 7,745,757 B2
(45) Date of Patent: Jun. 29, 2010

(54) WELDING APPARATUS FOR CARRYING A WELDING GUN ALONG A SURFACE TO BE WELDED

(75) Inventors: Edward A. Enyedy, Eastlake, OH (US); Jeff Klein, Mentor, OH (US)

(73) Assignee: Lincoln Global, Inc., City of Industry, CA (US)

(*) Notice: Subject to any disclaimer, the term of this patent is extended or adjusted under 35 U.S.C. 154(b) by 85 days.

(21) Appl. No.: 11/518,780

(22) Filed: Sep. 11, 2006

(65) Prior Publication Data

US 2008/0093345 A1    Apr. 24, 2008

(51) Int. Cl.
B23K 9/12    (2006.01)
(52) U.S. Cl. .................... 219/124.31; 219/136
(58) Field of Classification Search ............ 219/124.31, 219/136, 137.31; 228/45
See application file for complete search history.

(56) References Cited

U.S. PATENT DOCUMENTS

| | | | | |
|---|---|---|---|---|
| 1,788,042 A | * | 1/1931 | Bardaxoglou | 152/276 |
| 1,938,819 A | * | 12/1933 | Eskilson | 228/19 |
| 2,596,322 A | * | 5/1952 | Zumwalt | 33/21.1 |
| 3,916,140 A | * | 10/1975 | Clews | 219/100 |
| 3,935,420 A | | 1/1976 | Sandstrom | |
| 4,131,783 A | * | 12/1978 | Kensrue et al. | 219/124.31 |
| 4,354,087 A | | 10/1982 | Osterlitz | |
| 4,659,904 A | * | 4/1987 | Greineder | 219/130.21 |
| 4,763,376 A | * | 8/1988 | Spurlock et al. | 15/104.31 |
| 5,251,408 A | * | 10/1993 | Boaz | 451/450 |

| | | |
|---|---|---|
| 6,713,710 B1 | 3/2004 | Zhang |

FOREIGN PATENT DOCUMENTS

| | | |
|---|---|---|
| GB | 184141 | 5/1923 |
| JP | 54-132447 | 10/1979 |
| JP | 56-126076 | 10/1981 |

OTHER PUBLICATIONS

The Standard Handbook of Plant Engineering, Third Edition. By: Robert Rosaler. © 2003 by McGraw-Hill. p. 4.60.*
Tribology of Abrasive Machining Processes. By: Marinescu, Joan D.; Rowe, W. Brian; Dimitrov, Boris; Inasaki, Ichiro © 2004 William Andrew Publishing. p. 369.*
Shigley, Joseph E.; Mischke, Charles R.; Brown, Thomas H. Jr. Standard Handbook of Machine Design (3rd Edition). (pp. 32.7-32.9). McGraw-Hill.*

(Continued)

Primary Examiner—Jessica L Ward
Assistant Examiner—Megha Mehta
(74) Attorney, Agent, or Firm—Calfee, Halter & Griswold LLP

(57) ABSTRACT

A welding apparatus is provided for carrying a welding gun across or past a surface for making welds. The apparatus may include one or more rolling components, such as wheels for example, that do not substantially plastically deform as a result of contacting or being in close proximity to recently completed welds or preheated joints and provide adequate traction to move the apparatus across or past the surface. A portion of the contact surface of the rolling component may be configured with a given surface roughness to provide sufficient traction.

12 Claims, 4 Drawing Sheets

OTHER PUBLICATIONS

Lincoln Electric brochure Publication E9.70 Dec. 2003, LT-7 Tractor, 4 pgs.

A2 Multitrac (PEH) SAW, Welding Automation Category Page, http://products.esabna.com/index.html/session_id/..., printed Apr. 25, 2006, 5 pgs.

Blueprint Drawing No. S15191, LT Tractors, Wheel, Lincoln Global, Inc., document revision C, one page, printed Apr. 24, 2006.

Blueprint Drawing No. S15191, LT Tractors, Wheel, Lincoln Global, Inc., document revision A, one page, printed Apr. 24, 2006.

International Search Report and Written Opinion from PCT/US07/076610, mailed Feb. 21, 2008.

* cited by examiner

US 7,745,757 B2

WELDING APPARATUS FOR CARRYING A WELDING GUN ALONG A SURFACE TO BE WELDED

BACKGROUND

Welding carriages are often used in arc welding processes to carry the arc welding gun along a weld plate for making continuous or intermittent welds to join the weld pate to another plate. Welding carriages typically include wheels to facilitate smooth and consistent rolling movement of the carriage over the weld plate or along a track. Known welding carriages utilize elastomer or plastic wheels to provide adequate traction.

SUMMARY

This disclosure relates generally to a welding apparatus that moves a welding gun past or across a surface. One inventive concept disclosed in this application provides an apparatus having one or more components, such as wheels for example, that allow rolling movement of the apparatus while not substantially plastically deforming, burning, or softening when in contact with or in close proximity to recently completed welds or other preheated joins and providing adequate traction to move the apparatus across the surface. In one embodiment, the apparatus includes at least one wheel having at least a portion of its contact surface configured with a given surface roughness to provide sufficient traction. In another embodiment, at least one wheel may be a grinding wheel, a modified grinding wheel, or like a grinding wheel in structure and manufacture.

Another inventive concept disclosed in this application provides for a welding system that includes an apparatus that moves a welding gun across or past a surface. The system may include a welding gun and weld wire feeder mounted to a frame that includes one or more rolling components, such as wheels for example, that do not substantially plastically deform, burn, or soften when in contact with or in close proximity to recently completed welds or other preheated joints and provided adequate traction to move the apparatus across or past a surface.

Numerous other advantages and features of the present invention will become readily apparent from the following detailed description of the inventions and the embodiments thereof, from the claims and from the accompanying drawings.

BRIEF DESCRIPTION OF THE DRAWINGS

The foregoing features of the present invention will become apparent to one skilled in the art to which the present invention relates upon consideration of the following description of the invention with reference to the accompanying drawings, in which.

DETAILED DESCRIPTION

Figure 1:
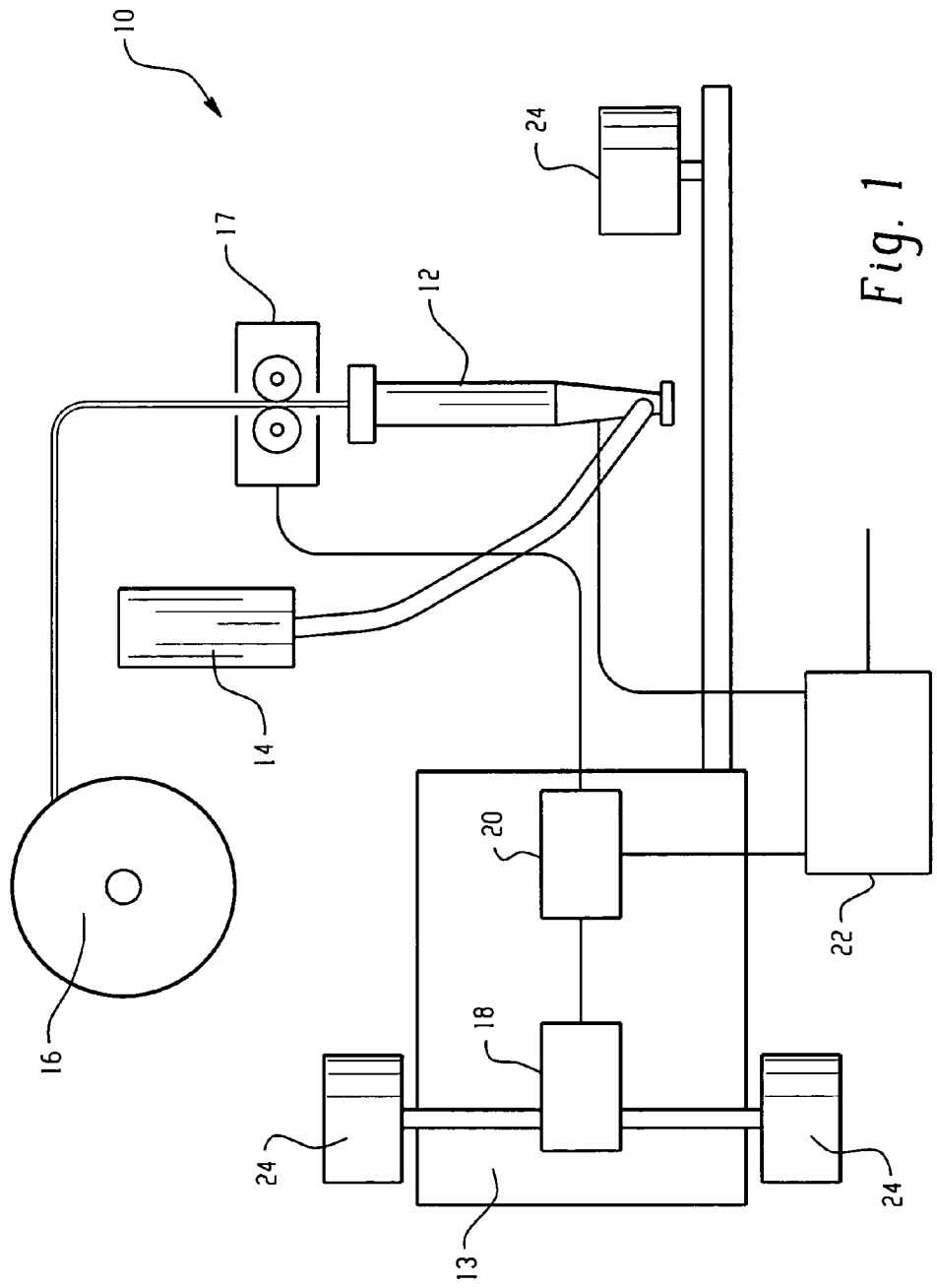
FIG. 1 is an schematic representation of an exemplary embodiment of an apparatus for moving a weld gun past a surface.

The present application discloses an apparatus for moving a welding gun past or across a surface and includes a component for facilitating rolling movement of the apparatus. The component for facilitating rolling movement may have sufficient heat resistance to not substantially plastically deform, burn, melt, or soften as a result of exposure to the heat of recently completely welds or preheated joints while providing adequate traction for the apparatus to move. While the exemplary embodiments illustrated and described herein are presented in the context of a welding carriage having at least one wheel that is a grinding wheel, a modified grinding wheel, or like a grinding wheel in structure and manufacture, rotatably mounted to the carriage, those skilled in the art will readily appreciate that the present invention may be configured in other ways.

For example, the apparatus may be any suitable device for moving a weld gun across a surface, not necessarily a welding carriage. The apparatus may also include one or more rolling components other than wheels for providing rolling movement of the apparatus. Still further, the wheel or rolling component need not be a grinding wheel. The rolling component may be any component that may provide rolling movement while being sufficient heat resistance to not deform when exposed to the hear of recently completed welds and provide sufficient traction with the surface being rolled across. The examples and the disclosed exemplary embodiments are intended to illustrate the broad application of the invention and provide no limitation on the present invention.

While various inventive aspects, concepts and features of the inventions may be described and illustrated herein as embodied in combination in the exemplary embodiments, these various aspects, concepts and features may be used in may alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, circuits, devices and components, software, hardware, control logic, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiment are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure; however, such values and rages are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention, the inventions instead being set forth in the appended claims. Descriptions of exemplary methods or processes are not limited to inclusion of all steps as being required in all cases, nor is the order that the steps are presented to be construed as required or necessary unless expressly so stated.

FIG. 1 schematically illustrates one embodiment of the apparatus 10. In this embodiment, the apparatus 10 is realized as a self-propelled welding carriage, though that is not required. The apparatus 10 may include a welding gun 12 and other welding components attached to a frame 13 for creating a weld along a surface. The other welding components may include, but are not required or limited to, a flux hopper 14 (if the apparatus is performing submerged arc welding), a wire feeder spool 16, a wire feeder drive assembly 17, a drive unit 18, such as an electric motor for example, a control unit 20 or a connection to a control device, and a connection to a power source 22. In some embodiments, the apparatus 10 may also include a pre-heat torch for heating the weld joint prior to welding or additional welding guns.

The apparatus 10 may also include one or more components 24 for facilitating rolling movement of the apparatus over the surface. In the example in FIG. 1, the one or more components 24 for facilitating rolling movement is realized as one or more wheels.

Figure 2:
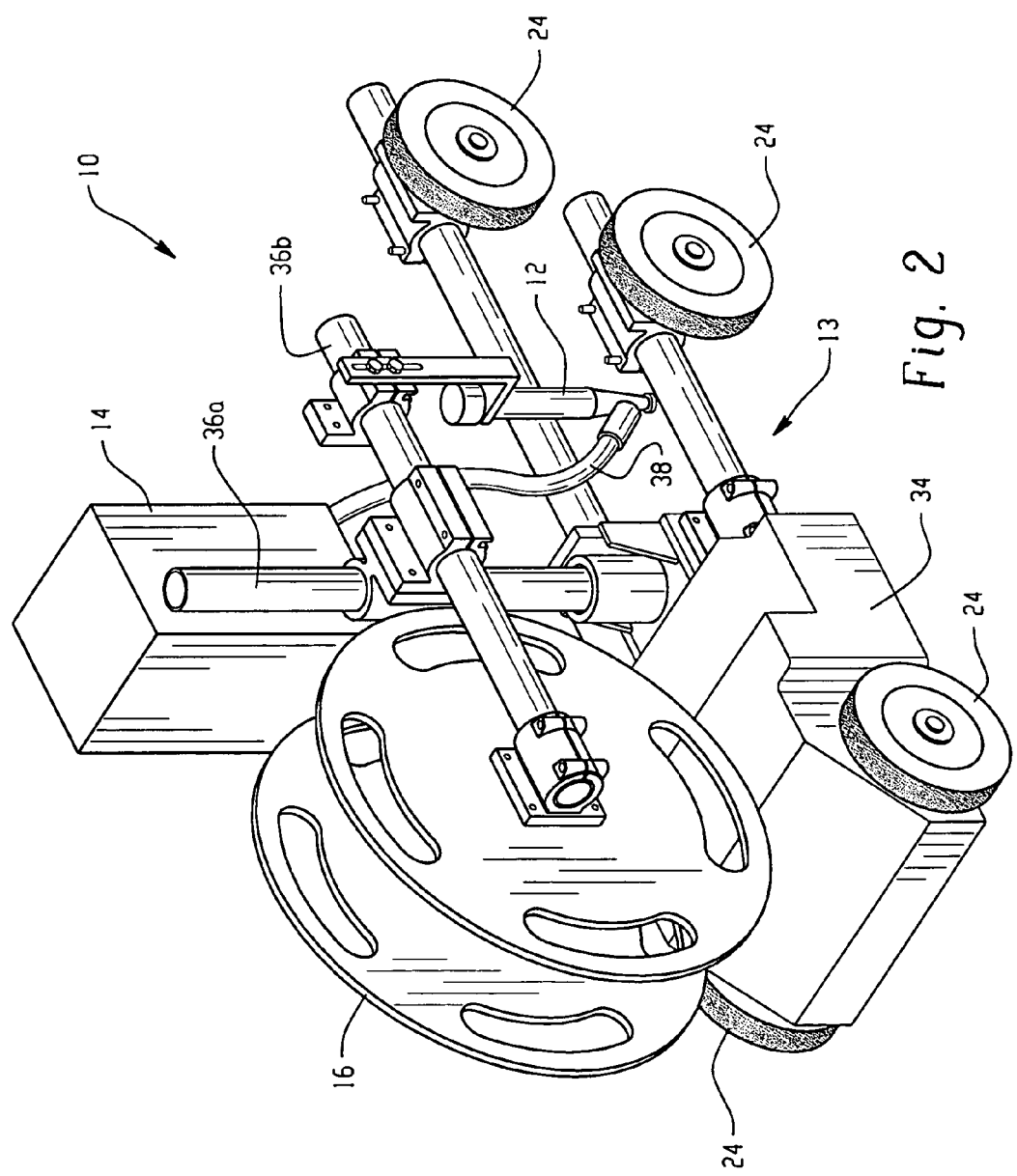
FIG. 2 is a perspective view of the apparatus of FIG. 1.
Figure 3:
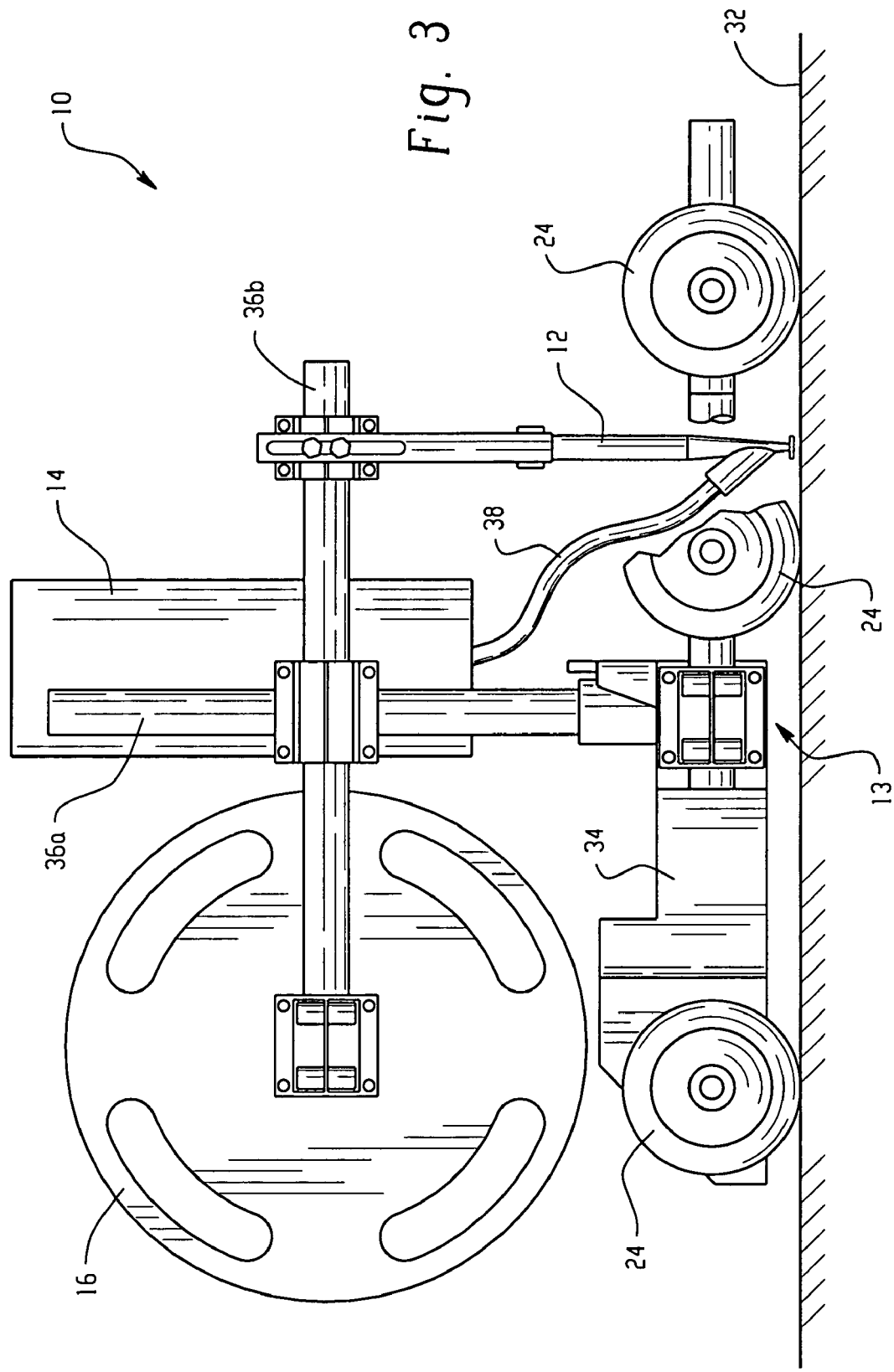
FIG. 3 is a side view of the apparatus of FIG. 1.

In reference to FIGS. 2 and 3, the frame 13 of the apparatus 10 may have the one or more wheels 24 rotatably mounted to allow the apparatus to roll or be driven along a surface 32 (FIG. 2) or track assembly. As depicted, the apparatus 10 includes four wheels 24. The apparatus 10, however, may include more or less that four wheels in other embodiments and remain within the spirit and scope of the invention. Further, all the wheels 24 may be configured alike or one or more of the wheels may differ from the remaining wheels.

The frame 13 may include a housing portion 34. The housing portion 34 may contain the drive unit or motor 18 (FIG. 1) for rotating one or more or the wheels 24. The drive unit 18 may be any device, such and electrical motor for example, that is capable of driving the wheels 24 to move the apparatus 10 along its desired path.

The apparatus 10 may also include one or more support members 36 supported by the frame 13. The embodiment of FIGS. 2-3 include a vertical support member 36a and a horizontal support member 36b. The number and orientation of the support members 36, however, may vary in different embodiments of the apparatus 10.

The weld gun 12, the flux hopper 14, and the wire feeder spool 16 may mount onto the frame 30. As depicted, the apparatus 10 is configured to provide submerged arc welding, thus the weld gun 12 may be adapted for submerged arc welding and the flux hopper 14 may contain granular flux, which is dispersed to the tip of the weld gun. The apparatus 10, however, may be configured to provide other styles of welding, such a gas metal arc welding.

The wire feeder spool 16 may be rotatably mounted to the horizontal support member 36b, though other locations are possible. Welding wire (not shown), such as for example low or mild steel flux cored or solid weld wire, may be wound around the spool 16 for distribution to the welding gun 12. The wire spool 16 may be driven by the wire drive assembly 17 (FIG. 1). For clarity, the wire drive assembly 17 is not shown in FIGS. 2-3, though the wire drive assembly may mount onto the horizontal support member 36b or other suitable location.

The flux hopper 14 may mount to the vertical support member 36a, though other location are possible. The flux hopper 14 may communicate submerged arc flux to the weld gun 12 via a conduit 38. The weld gun 12 may be adjustably mounted to the horizontal support member 36b, which allow the position of the weld gun to be adjusted as desired.

The control system 20 may be provided to control the operation of the apparatus 10, including starting and stopping the apparatus and the weld gun 12. The control system 20 may be a system known for use with welding carriage and may differ for different embodiments of the invention. The control system 20, however, is not limited to a known system and may be a system newly developed or modified from a known system. In one embodiment, the control system 20 may mount onto the welding carriage frame 30. In another embodiment, the control system 20 may be incorporated into a hand held pendant in communication with the carriage 10.

The power source or supply 22 for powering the gun 12, control system 20, and drive unit 18 may be in circuit communication with the carriage 10. A single power source may be used, or multiple power sources may be used to supply power to the various components. The voltage and current needed to properly operate the weld gun 12 may vary depending on the gun type and the welding application, which are well known in the art. Generally, arc welding processes can use AC or DC power, and constant voltage or constant current source, depending on the application.

Figure 4:
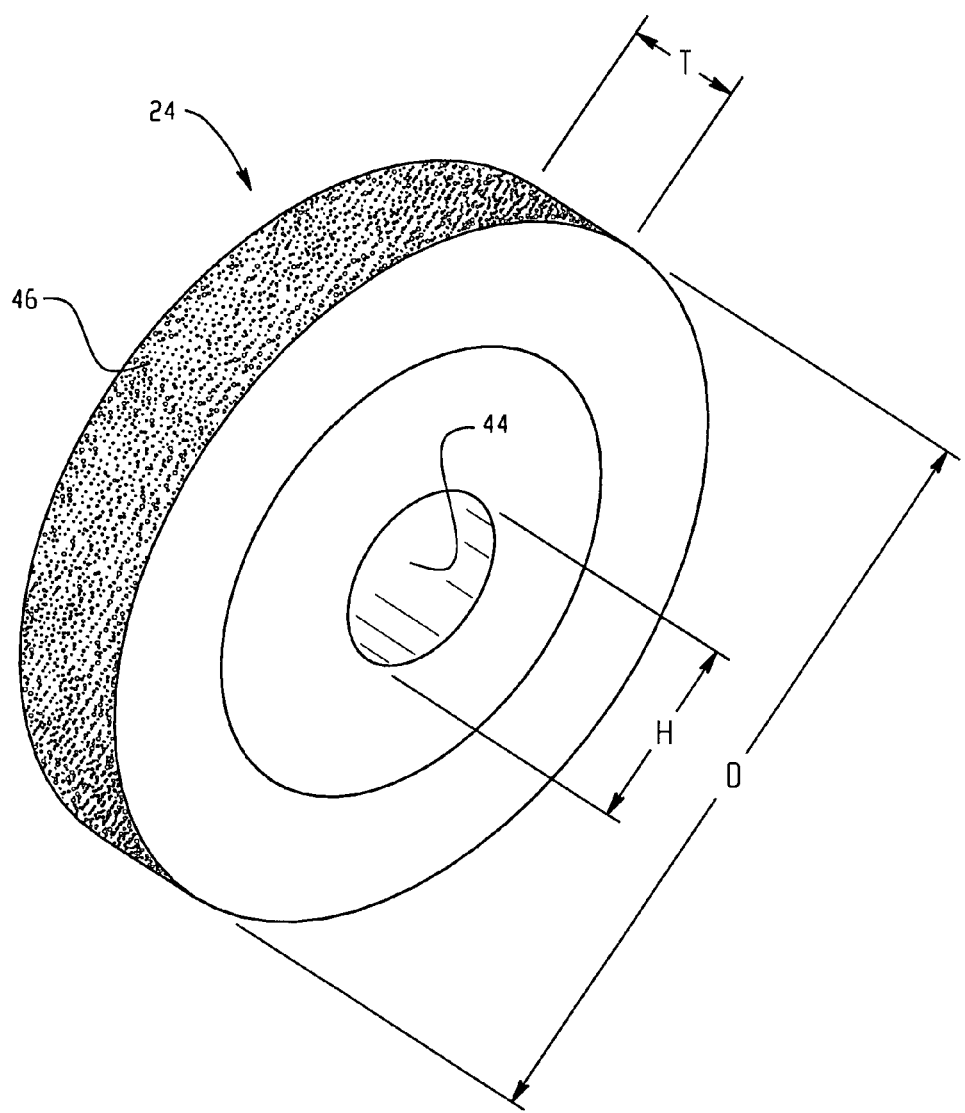
FIG. 4 is an isometric view of an embodiment of a wheel for the apparatus of FIG. 1.

The wheels 24 allow the apparatus 10 to move across or past a surface, such as for example a weld plate or other workpiece. The apparatus 10 may travel in a forward or reverse direction at a speed and direction controlled via the control system 20. As shown in FIG. 4, the wheels 24 may include a center hole 44. The diameter H of the center hole 44 may be configured or selected as desired to receive a rotatable shaft or bushing for mounting to the apparatus 10. The profile of the wheel 24 is generally circular with a diameter D. The wheel 24 may also have a thickness T. The diameter D and thickness T may be configured or selected as desired for mounting the wheel 24 onto a particular embodiment of the apparatus 10. When rotatably mounted to the apparatus 10, the contact surface 46 of the wheel 24 engages the surface being moved across.

The contact surface 46 of the wheels 24 may be configured to provide sufficient traction or friction with the surface to allow the apparatus 10 to roll across the particular surface. Thus, the coefficient of rolling friction $\mu_r$ between the contact surface of the wheel and the ground may be selected or configured to at least allow for sufficient traction in a particular application. The rolling friction $\mu_r$ between the wheel 24 of the wheel and the surface may be configured to a sufficient level by providing a contact surface 46 with a predetermined level of roughness. For example, the contact surface 46 may be modified to a given roughness level, such as for example by knurling or other surface modification. The contact surface 46 may also be formed with a material that provide a given level of roughness. For example, in one embodiment of the wheels 24, at least a portion of the contact surface 46 may include an abrasive material or other friction enhancing material. In the illustrated embodiment of FIG. 4, the entire outer face of the wheel 46 is illustrated as including an abrasive material, however, this is not required. For example, only sections of the contact surface, such as intermittent vertical strips or areas, may include the abrasive material.

The wheels 24 of the apparatus 10 may be exposed to the high temperatures of recently completed welds or preheated weld joints. For example, depending on the alloy, steel often melts around 2,500 degrees Fahrenheit and, in arc welding, the welding arc may produce a temperature of about 6,500 degrees Fahrenheit at the tip. The wheels 24 of the apparatus 10, tough not exposed to those extreme temperatures, nevertheless may be exposed to high temperatures, such as above 500 degrees or above 1000 degrees Fahrenheit. Therefore, the wheels 24 should have sufficient heat resistance to not plastically deform, burn, or soften when exposed to the high temperatures of a recently completed weld while providing sufficient traction with the surface to allow the apparatus to effectively move along the surface.

Grinding wheels, modified grinding wheels, or wheels that are like a grinding wheel in structure and manufacture may have suitable properties for use on the apparatus 10. These types of wheels 24 are effective for use on the apparatus 10 because they are capable of withstanding exposure to the high temperature of a recently completed weld without significantly deforming while the abrasive quality of the wheels provides adequate traction with the floor or weldplate. An example of a suitable wheel is a Gemini 57A16-QS aluminum oxide snagging wheel available from Norton Abrasives.

As used in this application, a grinding wheel refers to any wheel that is made with an abrasive compound or carries an abrasive compound or particles on an outer face. This would include wheels designed for grinding or snagging (rough grinding). Any abrasive compound that may be used to supply the abrasive natural of the grinding wheel (i.e. capable of for removing surface material from an object, usually metal, by the abrasive action of the rotating wheel) is suitable. This includes, but not limited to, materials commonly used in grinding such as silicon carbide, aluminum oxide, zirconia alumina, ceramic aluminum oxide, seed get and combinations thereof. Abrasive materials and particles, as used in this application, do not include those materials commonly used in vehicle wheels, such as rubbers and plastics.

The wheel 24 may be made from a matrix of coarse abrasive particles pressed and bonded together to form a solid, circular shape. For example, a bonding material, such as clay for example, may be mixed with the abrasive particles to form the wheels 24. Thus, the majority of the wheels 24 may be compromised of the pressed mixture of the bonding material and the abrasive particles. Other suitable manufacturing methods are also possible. For example, the wheels 24 may be made from a rigid core material, such as for example a solid steel or aluminum disc, with abrasive particles bonded to the outer surface or face of the core.

The abrasiveness and weight of the wheels 24 provide the traction for the apparatus 10 to effectively move along the surface 32. The abrasiveness of the wheel may vary depending on the materials used and the desired roughness of the wheel 24.

The above description of some of the embodiments of the present invention has been given by way of example. From the disclosure given, those skilled in the art will not only understand the present invention and its attendant advantages, but will also find apparent various changes and modifications to the structures and methods disclosed. It is sought, therefore, to cover all such changes and modifications as fall within the spirit and scope of the invention, as defined by the appended claims, and equivalents thereof.

What is claimed is:

1. An apparatus for moving a weld gun across a workpiece to be welded, comprising: a housing; a welding gun supported by the housing; and at least one driven rotatable component rotatably mounted to the housing and having a workpiece contacting outer face that does not include rubber but that includes an abrasive material for providing rolling movement of the apparatus across the workpiece; wherein the outer face of the at least one rotatable component does not plastically deform as a result of being exposed to a temperature of at least 500 degrees Fahrenheit and provides traction to move the apparatus across the workpiece during a welding operation.

2. The apparatus of claim 1 wherein the abrasive material includes at least one of aluminum oxide, silicon carbide, zirconia alumina, ceramic aluminum oxide, and seed gel.

3. The apparatus of claim 1 wherein the outer face comprises intermittent areas of abrasive material.

4. The apparatus of claim 1 wherein the at least one rotatable component is one of: a grinding wheel, a modified grinding wheel, or like a grinding wheel in manufacture and structure.

5. The apparatus of claim 1 wherein a majority of the rotatable component is comprised of a pressed mixture of a bonding material and abrasive particles.

6. The apparatus of claim 1 wherein the at least one rotatable component does not plastically deform as a result of being exposed to a temperature of at least 800 degrees Fahrenheit.

7. The apparatus of claim 1 further comprising a motor for driving the apparatus.

8. The apparatus of claim 1, wherein the rotatable component further comprises a rigid core material, the abrasive material being bonded to an outer surface of the rigid core material.

9. The apparatus of claim 8, wherein the rigid core material comprises a solid metal disc.

10. The apparatus of claim 1, wherein the at least one rotatable component comprises a solid disc formed from a matrix of coarse abrasive particles.

11. The apparatus of claim 1, wherein the rotatable component is a solid, non-tired wheel.

12. The apparatus of claim 1, wherein the rotatable component is a grinding wheel.

\* \* \* \* \*